(12) United States Patent
Barsness et al.

(10) Patent No.: US 8,127,273 B2
(45) Date of Patent: *Feb. 28, 2012

(54) NODE SELECTION FOR EXECUTING A JAVA APPLICATION AMONG A PLURALITY OF NODES

(75) Inventors: Eric L. Barsness, Pine Island, MN (US); David L. Darrington, Rochester, MN (US); Amanda Peters, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1066 days.

This patent is subject to a terminal disclaimer.

(21) Appl. No.: 11/937,564

(22) Filed: Nov. 9, 2007

(65) Prior Publication Data

US 2009/0125883 A1 May 14, 2009

(51) Int. Cl.
*G06F 9/44* (2006.01)
(52) U.S. Cl. ........ 717/107; 717/103; 717/106; 717/108; 717/120; 717/166; 709/201; 709/204
(58) Field of Classification Search .................. None
See application file for complete search history.

(56) References Cited

U.S. PATENT DOCUMENTS

| | | | | |
|---|---|---|---|---|
| 6,011,918 A * | 1/2000 | Cohen et al. | ........... | 717/106 |
| 6,199,196 B1 * | 3/2001 | Madany et al. | ........... | 717/165 |
| 6,202,208 B1 * | 3/2001 | Holiday, Jr. | ........... | 717/166 |
| 6,618,737 B2 * | 9/2003 | Aridor et al. | ........... | 1/1 |
| 6,658,479 B1 * | 12/2003 | Zaumen et al. | ........... | 709/238 |
| 6,738,977 B1 * | 5/2004 | Berry et al. | ........... | 719/332 |
| 6,779,030 B1 * | 8/2004 | Dugan et al. | ........... | 709/223 |
| 6,842,759 B2 * | 1/2005 | Haggar et al. | ........... | 1/1 |
| 7,100,199 B2 * | 8/2006 | Ginter et al. | ........... | 726/4 |
| 7,197,565 B2 * | 3/2007 | Abdelaziz et al. | ........... | 709/226 |
| 7,209,964 B2 * | 4/2007 | Dugan et al. | ........... | 709/223 |
| 7,254,608 B2 * | 8/2007 | Yeager et al. | ........... | 709/203 |
| 7,272,815 B1 * | 9/2007 | Eldridge et al. | ........... | 717/101 |
| 7,302,609 B2 * | 11/2007 | Matena et al. | ........... | 714/15 |
| 7,395,536 B2 * | 7/2008 | Verbeke et al. | ........... | 718/100 |
| 7,555,566 B2 * | 6/2009 | Blumrich et al. | ........... | 709/249 |
| 7,685,577 B2 * | 3/2010 | Pace et al. | ........... | 717/136 |
| 7,703,089 B2 * | 4/2010 | Birenheide | ........... | 717/166 |
| 7,827,566 B2 * | 11/2010 | Svetoslavov et al. | ........... | 719/331 |
| 7,844,835 B2 * | 11/2010 | Ginter et al. | ........... | 713/193 |

(Continued)

OTHER PUBLICATIONS

Title: Secure Java Class Loading, author: Li Gogn, source: IEEE, dated: Aug. 6, 2002.*

(Continued)

*Primary Examiner* — Chameli Das
(74) *Attorney, Agent, or Firm* — Biggers & Ohanian LLP

(57) ABSTRACT

Methods, apparatus, and products are disclosed for node selection for executing a Java application among a plurality of nodes connected together for data communications using a data communication network, the plurality of nodes also connected to a service node, that include: tracking, by the service node, loaded Java classes currently loaded on each of the plurality of nodes; receiving, in the service node, an instruction to execute a Java application using the plurality of nodes; identifying, by the service node, Java classes utilized in executing the Java application; selecting, by the service node, one of the plurality of nodes for executing the Java application in dependence upon the loaded Java classes and the Java classes utilized in executing the Java application; and configuring, by the service node, the Java application for execution on the selected node.

15 Claims, 8 Drawing Sheets

U.S. PATENT DOCUMENTS

| | | | |
|---|---|---|---|
| 2003/0037173 A1* | 2/2003 | Pace et al. | 709/310 |
| 2003/0041141 A1* | 2/2003 | Abdelaziz et al. | 709/223 |
| 2004/0088348 A1* | 5/2004 | Yeager et al. | 709/202 |
| 2004/0088646 A1* | 5/2004 | Yeager et al. | 715/500 |
| 2004/0098447 A1* | 5/2004 | Verbeke et al. | 709/201 |
| 2004/0111302 A1* | 6/2004 | Falk et al. | 705/4 |
| 2004/0162871 A1* | 8/2004 | Pabla et al. | 709/201 |
| 2005/0005200 A1* | 1/2005 | Matena et al. | 714/38 |
| 2005/0021713 A1* | 1/2005 | Dugan et al. | 709/223 |
| 2005/0086300 A1* | 4/2005 | Yeager et al. | 709/204 |
| 2006/0167887 A1* | 7/2006 | Galchev | 707/10 |
| 2007/0220522 A1* | 9/2007 | Coene et al. | 718/104 |
| 2009/0125611 A1 | 5/2009 | Barsnes et al. | |
| 2009/0125883 A1 | 5/2009 | Barsnes et al. | |

OTHER PUBLICATIONS

Title: JMangler—a framework for load-time transformation of Java class files, author: Kniesel, G et al, source: IEEE, dated: Aug. 6, 2002.*

U.S. Patent Application entitled, "Sharing Loaded Java Classes Among a Plurality of Nodes," filed Nov. 8, 2007, U.S. Appl. No. 11/937,099.

Office Action, U.S. Appl. No. 12/109,271, Sep. 29, 2011.

Office Action, U.S. Appl. No. 11/937,099, Oct. 6, 2009.

Final Office Action, U.S. Appl. No. 11/937,099, Mar. 29, 2010.

Office Action, U.S. Appl. No. 11/937,564, Apr. 20, 2011.

* cited by examiner

NODE SELECTION FOR EXECUTING A JAVA APPLICATION AMONG A PLURALITY OF NODES

BACKGROUND OF THE INVENTION

1. Field of the Invention

The field of the invention is data processing, or, more specifically, methods, apparatus, and products for node selection for executing a Java application among a plurality of nodes.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. A torus network lends itself to point to point operations. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers. A tree network provides high bandwidth and low latency for certain collective operations, message passing operations where all compute nodes participate simultaneously, such as, for example, an allgather.

The parallel applications that execute on the nodes in the data communications networks may be implemented in a variety of software programming languages, including the various versions and derivatives of Java™ technology promulgated by Sun Microsystems. Java applications generally run in a virtual execution environment called the Java Virtual Machine ('JVM'), rather than running directly on the computer hardware. The Java application is typically compiled into byte-code form, and then interpreted by the JVM into hardware commands specific to the hardware platform on which the JVM is installed. Java is an object-oriented language. Java applications therefore are typically composed of a number of classes having methods that represent sequences of computer program instructions and data elements that store state information. At run-time, these classes are instantiated as objects for use during execution of the application. To perform the instantiation, Java relies on an object referred to as a Java Classloader. The Java Classloader is responsible for loading the Java classes into memory for the JVM and preparing the classes for execution. Because any given Java application may be composed of thousands of classes, loading and preparing these classes in the JVM may consume large amounts of time and computing resources. In addition, this problem is compounded because often during program execution many of the classes may be loaded and unloaded on demand in the JVM multiple times. As such, readers will appreciate any improvements that reduce the consumption of these valuable resources.

SUMMARY OF THE INVENTION

Methods, apparatus, and products are disclosed for node selection for executing a Java application among a plurality of nodes connected together for data communications using a data communication network, the plurality of nodes also connected to a service node, that include: tracking, by the service node, loaded Java classes currently loaded on each of the plurality of nodes; receiving, in the service node, an instruction to execute a Java application using the plurality of nodes; identifying, by the service node, Java classes utilized in executing the Java application; selecting, by the service node, one of the plurality of nodes for executing the Java application in dependence upon the loaded Java classes and the Java classes utilized in executing the Java application; and configuring, by the service node, the Java application for execution on the selected node.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
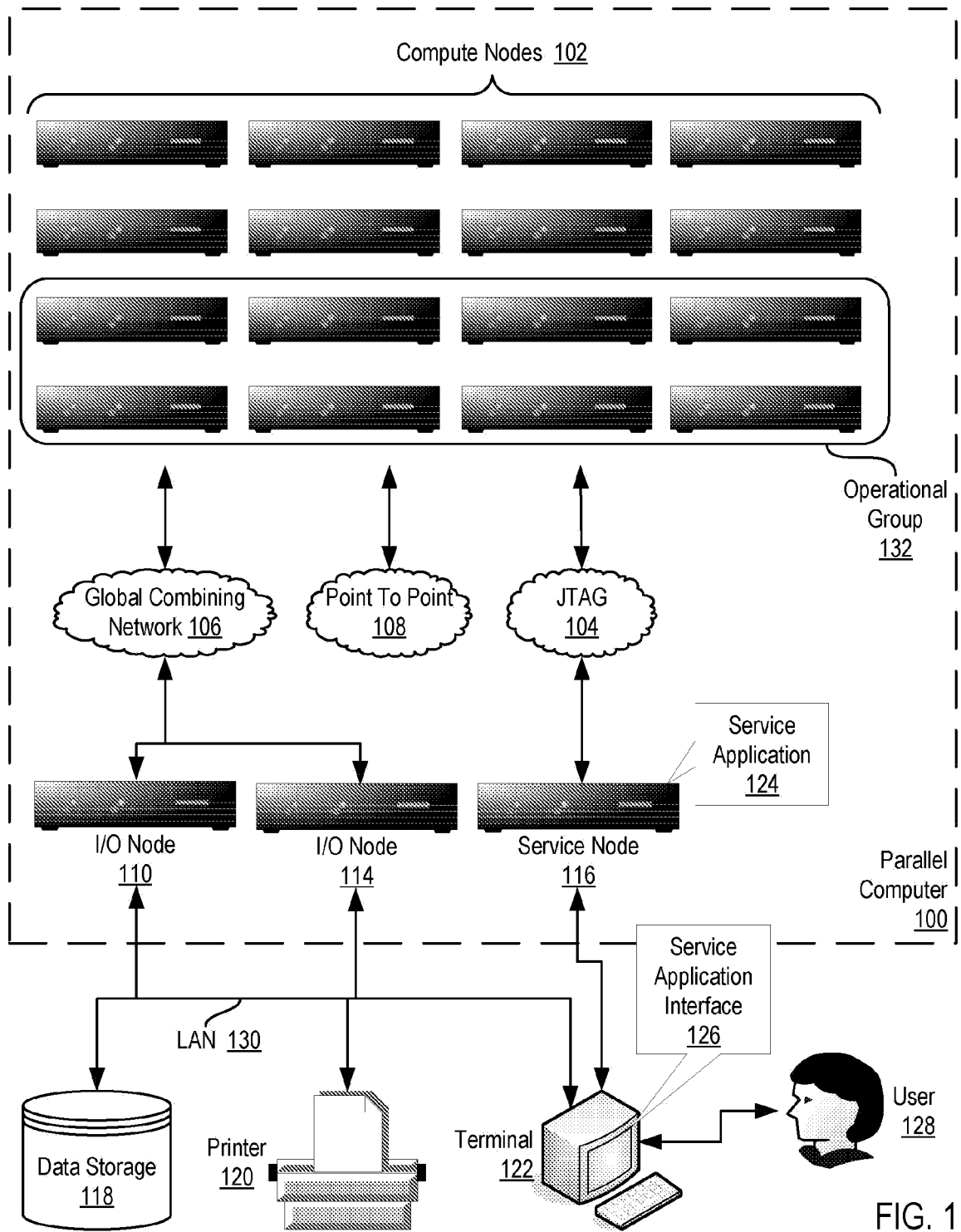
FIG. 1 illustrates an exemplary system for node selection for executing a Java application among a plurality of nodes according to embodiments of the present invention.

Exemplary methods, apparatus, and computer program products for node selection for executing a Java application among a plurality of nodes according to embodiments of the present invention are described with reference to the accompanying drawings, beginning with FIG. 1. FIG. 1 illustrates an exemplary system for node selection for executing a Java application among a plurality of nodes according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount * N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

MPI_MAX maximum
MPI_MIN minimum
MPI_SUM sum
MPI_PROD product
MPI_LAND logical and
MPI_BAND bitwise and
MPI_LOR logical or
MPI_BOR bitwise or
MPI_LXOR logical exclusive or
MPI_BXOR bitwise exclusive or In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the service application (124) of FIG. 1 includes a set of computer program instructions for node selection for executing a Java application among a plurality of nodes according to embodiments of the present invention. The term 'Java application' refers to an application that is designed and processed according to one of the versions or derivatives for Java™ technology promulgated by Sun Microsystems. The service application (124) of FIG. 1 operates generally for node selection for executing a Java application among a plurality of nodes according to embodiments of the present invention by: tracking loaded Java classes currently loaded on each of the plurality of nodes (102); receiving an instruction to execute a Java application (158) using the plurality of nodes (102); identifying Java classes utilized in executing the Java application (158); selecting one of the plurality of nodes (102) for executing the Java application (158) in dependence upon the loaded Java classes and the Java classes utilized in executing the Java application (158); and configuring the Java application (158) for execution on the selected node. Readers will note that the term 'Java class' refers to a class that conforms to one of the versions or derivatives for Java™ technology promulgated by Sun Microsystems.

In the example of FIG. 1, the plurality of nodes is implemented as a plurality of compute nodes (102) and are connected together using a plurality of data communications networks (104, 106, 108). The point to point network (108) is optimized for point to point operations. The global combining network (106) is optimized for collective operations. Although node selection for executing a Java application among a plurality of nodes according to embodiments of the present invention is described above in terms of sharing Java classes among compute nodes of a parallel computer, readers will note that such an embodiment is for explanation only and not for limitation. In fact, node selection for executing a Java application among a plurality of nodes according to embodiments of the present invention may be implemented using a variety of computer systems composed of a plurality of nodes network-connected together, including for example a cluster of nodes, a distributed computing system, a grid computing system, and so on.

The arrangement of nodes, networks, and I/O devices making up the exemplary system illustrated in FIG. 1 are for explanation only, not for limitation of the present invention. Data processing systems capable of node selection for executing a Java application among a plurality of nodes according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of node selection for executing a Java application among a plurality of nodes according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Node selection for executing a Java application among a plurality of nodes according to embodiments of the present invention may be generally implemented on a parallel computer that includes a plurality of compute nodes, among other types of exemplary systems. In fact, such computers may include thousands of such compute nodes. Each compute node is in turn itself a kind of computer composed of one or more computer processors, its own computer memory, and its own input/output adapters. In fact, a service node, which is used to configure the compute nodes, may itself be implemented as a specially-adapted compute node. For further explanation, therefore, FIG. 2 sets forth a block diagram of an exemplary service node (152) useful in a parallel computer capable of node selection for executing a Java application among a plurality of nodes according to embodiments of the present invention. The plurality of nodes is connected together for data communications using a data communication network.

Figure 2:
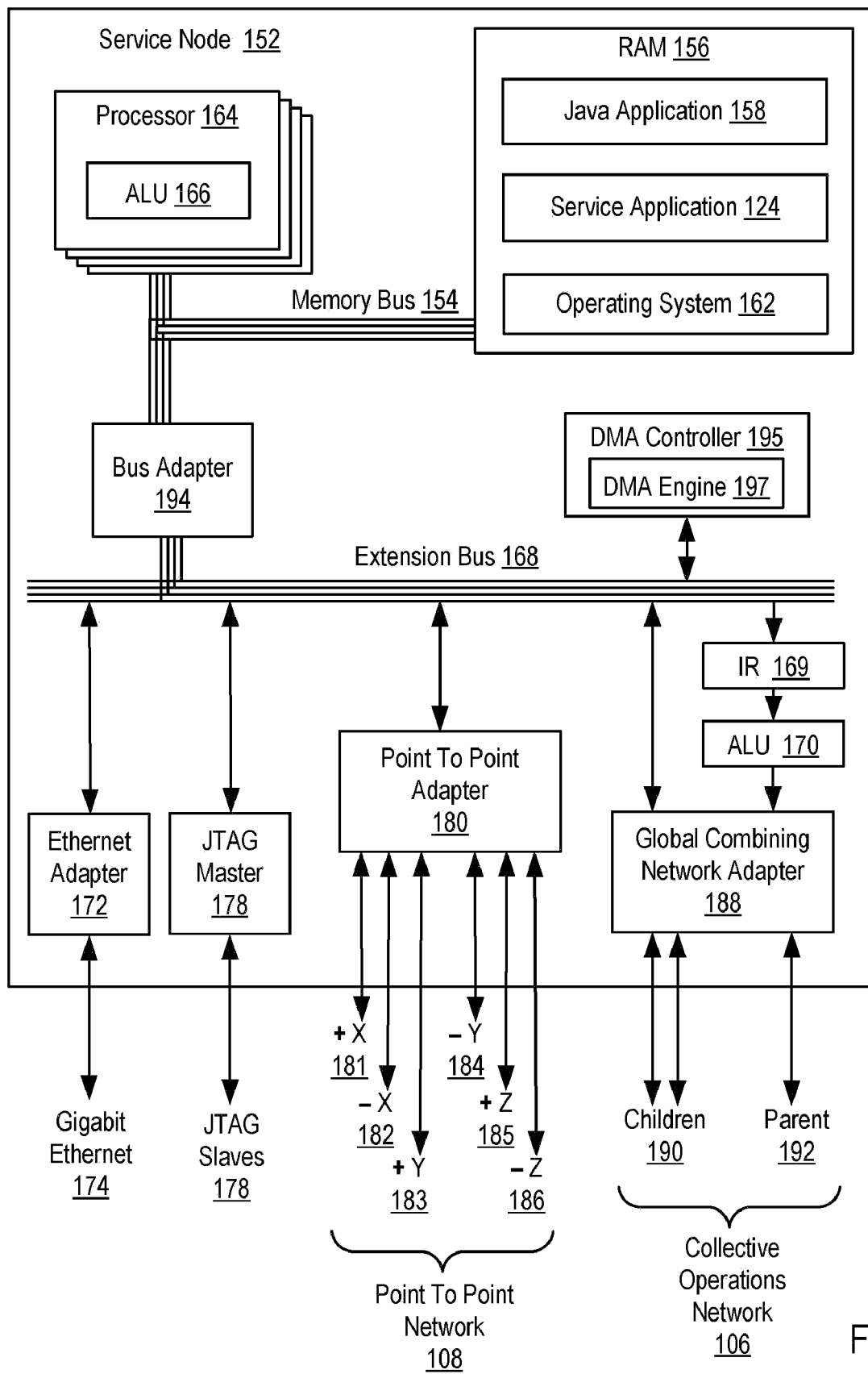
FIG. 2 sets forth a block diagram of an exemplary compute node useful in a parallel computer capable of node selection for executing a Java application among a plurality of nodes according to embodiments of the present invention.

The service node (152) of FIG. 2 includes one or more computer processors (164) as well as random access memory ('RAM') (156). The processors (164) are connected to RAM (156) through a high-speed memory bus (154) and through a bus adapter (194) and an extension bus (168) to other components of the service node (152). Stored in RAM (156) is a Java application (158), a module of computer program instructions that carries out parallel, user-level data processing using one or more Java classes. The service node (152) configures one of the plurality of compute nodes in the parallel computer to execute the Java application (158).

Also stored in RAM (156) is a service application (124), computer software for providing services common to pluralities of nodes, administering the configuration of nodes, loading programs into the nodes, starting program execution on the nodes, retrieving results of program operations on the nodes, and so on. The service application (124) of FIG. 2 includes a set of computer program instructions configured for node selection for executing a Java application among a plurality of nodes according to embodiments of the present invention. The service application (124) of FIG. 2 operates generally for node selection for executing a Java application among a plurality of nodes according to embodiments of the present invention by: tracking loaded Java classes currently loaded on each of the plurality of nodes; receiving an instruction to execute a Java application using the plurality of nodes; identifying Java classes utilized in executing the Java application; selecting one of the plurality of nodes for executing the Java application in dependence upon the loaded Java classes and the Java classes utilized in executing the Java application; and configuring the Java application for execution on the selected node.

Also stored in RAM (156) is an operating system (162), a module of computer program instructions and routines for an application program's access to other resources of the service node. Operating systems that may usefully be improved, simplified, for use in a service node include UNIX™, Linux™, Microsoft Vista™, AIX™, IBM's i5/OS™, and others as will occur to those of skill in the art.

The exemplary service node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for node selection for executing a Java application among a plurality of nodes according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example service node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Master circuit (178) that couples example service node (152) for data communications to JTAG Slave circuits (176) installed in the various nodes of the parallel computer. JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The compute nodes connected to the service node of FIG. 2 may be all three of these: It typically includes one or more integrated circuits installed on a printed circuit board and may be implemented as an embedded system having its own processor, its own memory, and its own I/O capability. JTAG boundary scans through JTAG Master (178) may efficiently configure processor registers and memory in service node (152) for use in node selection for executing a Java application among a plurality of nodes according to embodiments of the present invention.

The data communications adapters in the example of FIG. 2 includes a Point To Point Adapter (180) that couples example service node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example service node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example service node (152) includes two arithmetic logic units ('ALUs'). ALU (166) is a component of processor (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example service node (152) of FIG. 2 includes a direct memory access ('DMA') controller (195), which is computer hardware for direct memory access and a DMA engine (195), which is computer software for direct memory access. Direct memory access includes reading and writing to memory of compute nodes with reduced operational burden on the central processing units (164). A DMA transfer essentially copies a block of memory from one compute node to another. While the CPU may initiates the DMA transfer, the CPU does not execute it. In the example of FIG. 2, the DMA engine (195) and the DMA controller (195) support the messaging module (161).

Figure 3A:
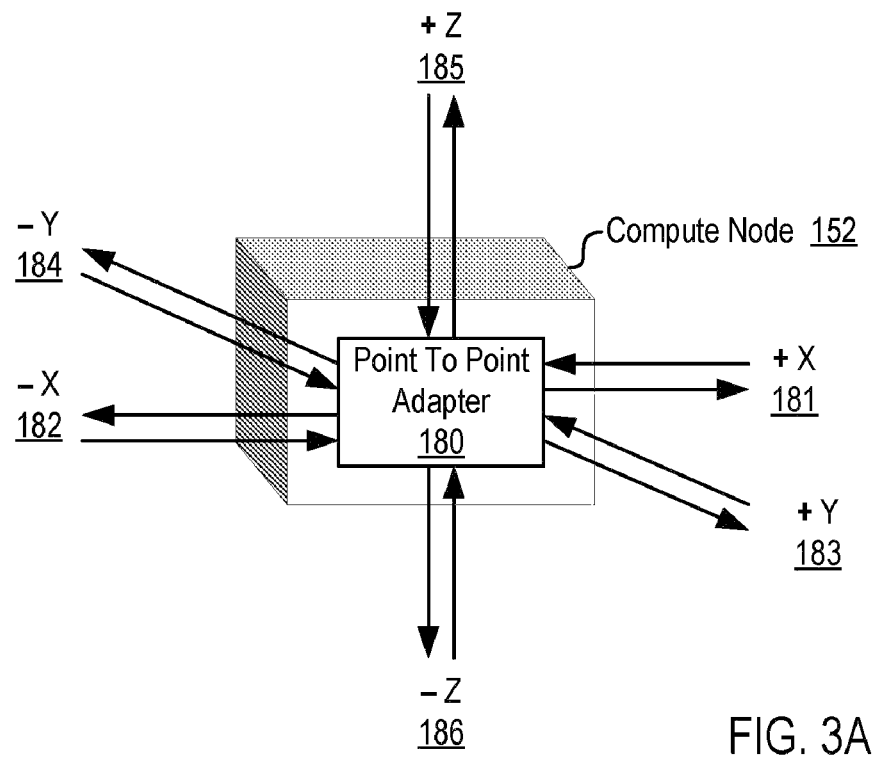
FIG. 3A illustrates an exemplary Point To Point Adapter useful in systems capable of node selection for executing a Java application among a plurality of nodes according to embodiments of the present invention.

For further explanation, FIG. 3A illustrates an exemplary Point To Point Adapter (180) useful in systems capable of node selection for executing a Java application among a plurality of nodes according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
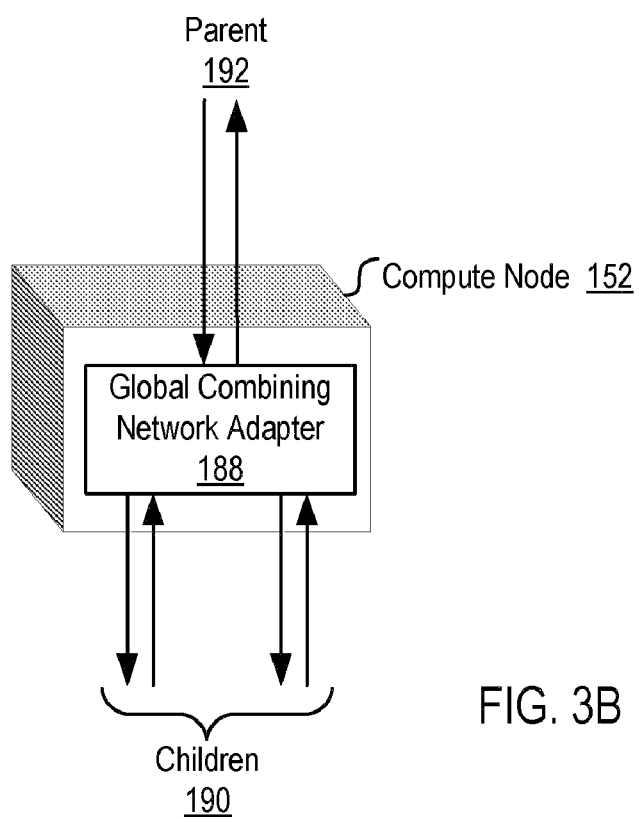
FIG. 3B illustrates an exemplary Global Combining Network Adapter useful in systems capable of node selection for executing a Java application among a plurality of nodes according to embodiments of the present invention.

For further explanation, FIG. 3B illustrates an exemplary Global Combining Network Adapter (188) useful in systems capable of node selection for executing a Java application among a plurality of nodes according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
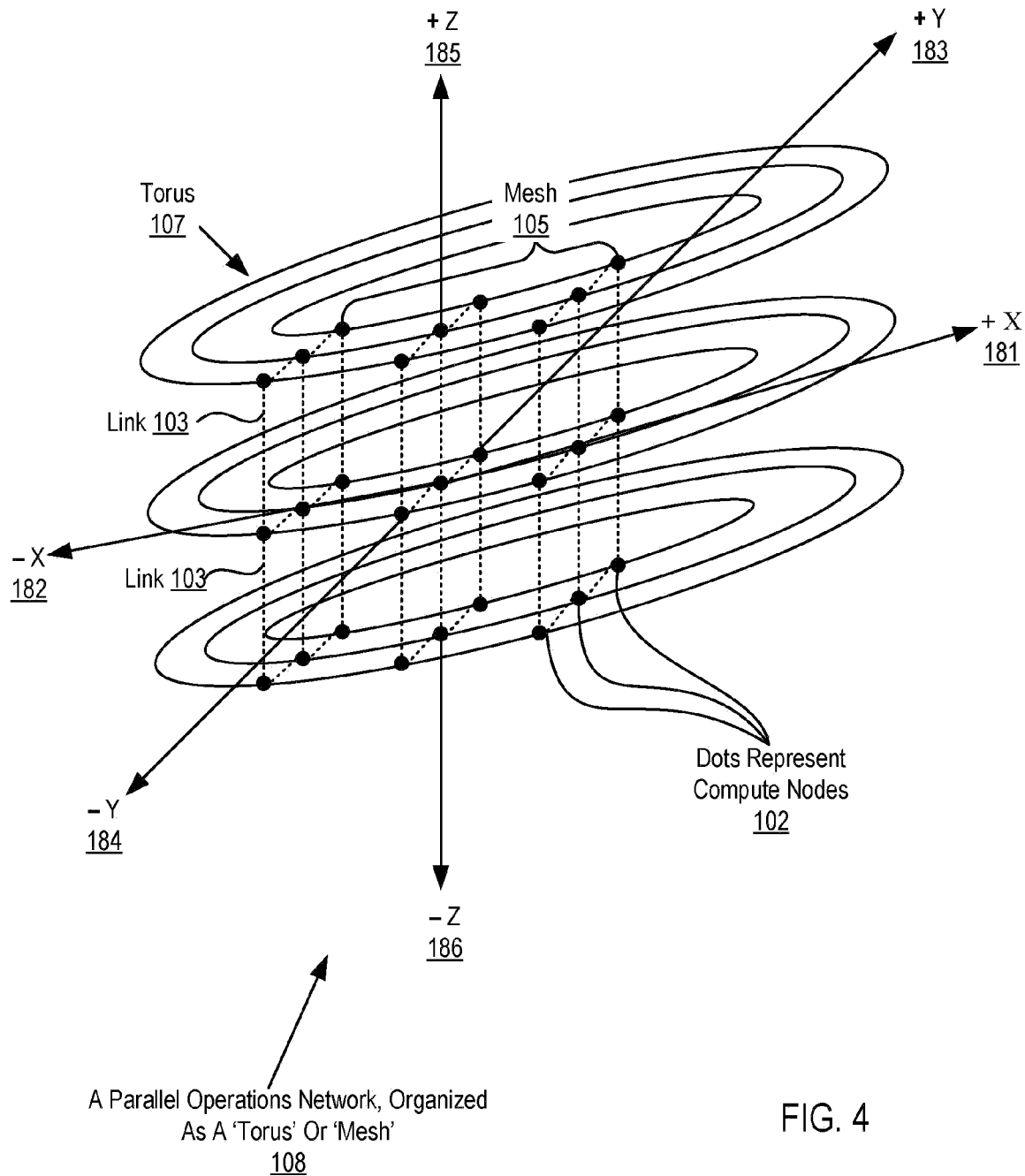
FIG. 4 sets forth a line drawing illustrating an exemplary data communications network optimized for point to point operations useful in systems capable of node selection for executing a Java application among a plurality of nodes in accordance with embodiments of the present invention.

For further explanation, FIG. 4 sets forth a line drawing illustrating an exemplary data communications network (108) optimized for point to point operations useful in systems capable of node selection for executing a Java application among a plurality of nodes in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in node selection for executing a Java application among a plurality of nodes in accordance with embodiments of the present invention may contain only a few compute nodes or may contain thousands of compute nodes.

Figure 5:
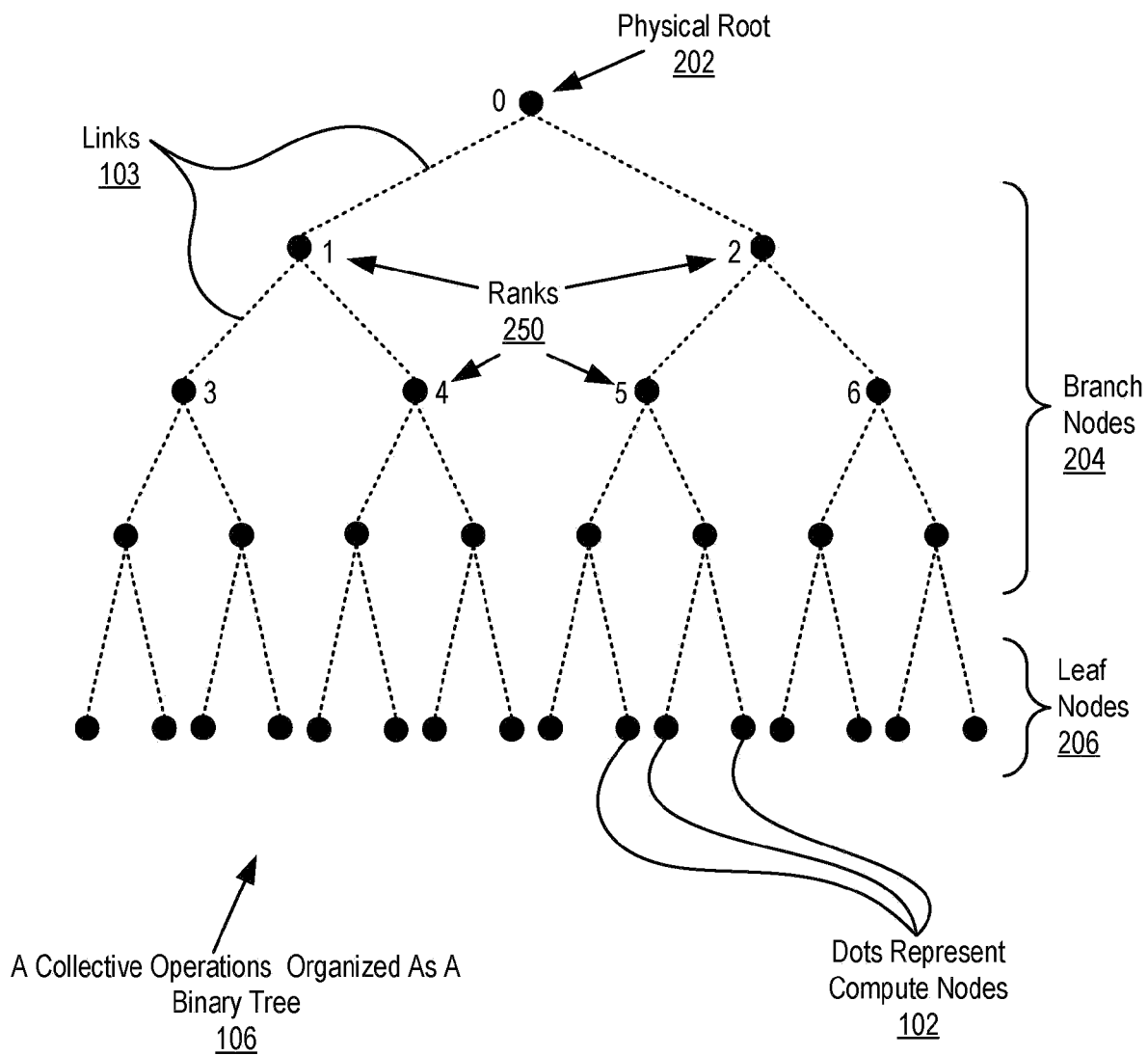
FIG. 5 sets forth a line drawing illustrating an exemplary data communications network optimized for collective operations useful in systems capable of node selection for executing a Java application among a plurality of nodes in accordance with embodiments of the present invention.

For further explanation, FIG. 5 sets forth a line drawing illustrating an exemplary data communications network (106) optimized for collective operations useful in systems capable of node selection for executing a Java application among a plurality of nodes in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for node selection for executing a Java application among a plurality of nodes in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
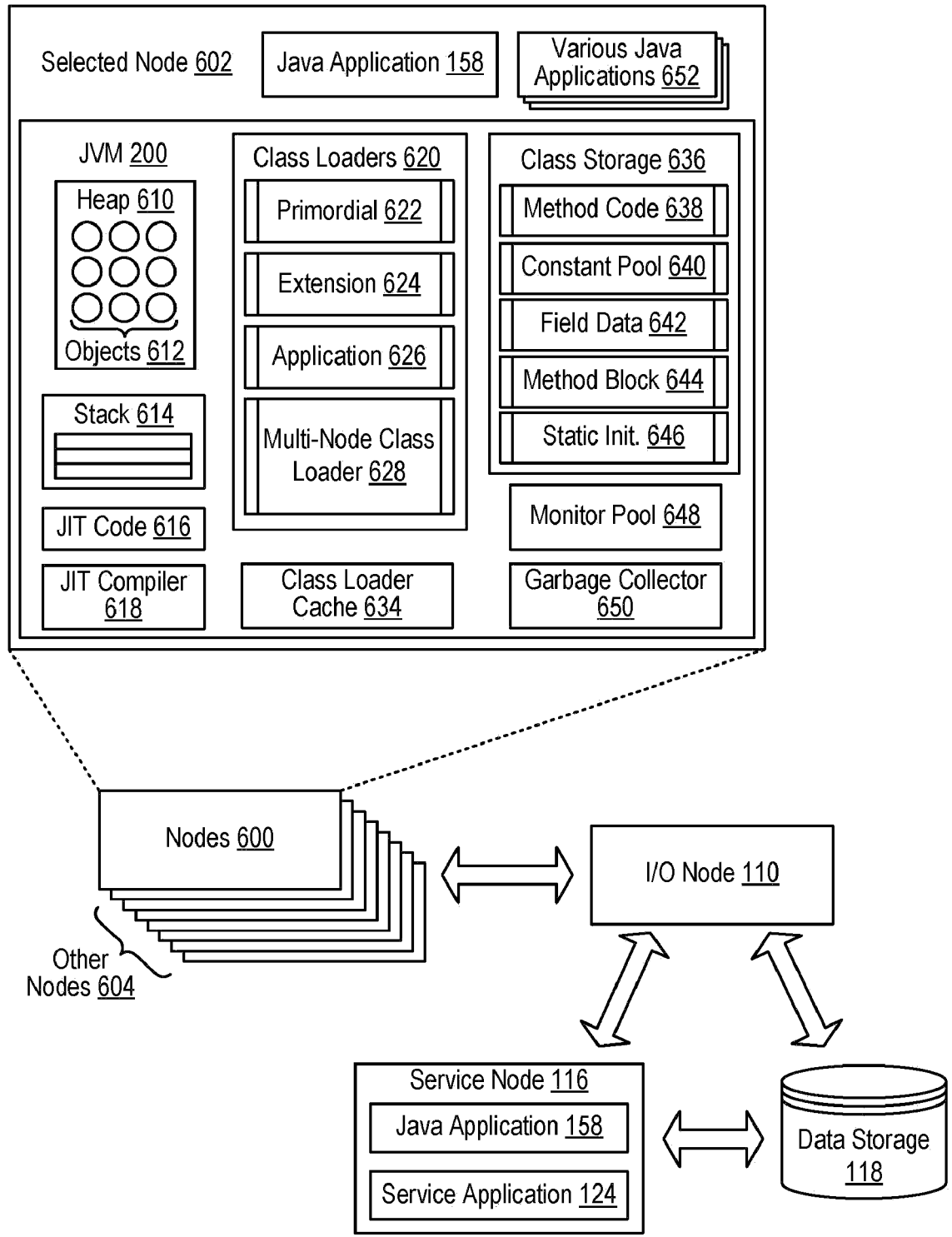
FIG. 6 sets forth a block diagram illustrating an exemplary system useful in node selection for executing a Java application among a plurality of nodes according to embodiments of the present invention.

For further explanation, FIG. 6 sets forth a block diagram illustrating an exemplary system useful in node selection for executing a Java application among a plurality of nodes (600) according to embodiments of the present invention. The nodes (600) of FIG. 6 are connected together for data communications using a data communication network. In addition, the nodes (600) are connected to an I/O node (110) that provides I/O services between the nodes (600) and a set of I/O devices such as, for example, the service node (116) and the data storage (118). The service node (116) of FIG. 6 provides services common to pluralities of nodes (600), administering the configuration of nodes (600), loading software programs into the nodes (600), starting program execution on the nodes (600), retrieving results of program operations on the nodes (600), and so on. In the example of FIG. 6, the service node (116) has configured various Java applications (652) and JVM (200) on node (602) for execution. The service node (116) may have originally retrieved the files that contain JVM (200) and the Java classes that compose the various Java applications (652) from data storage (118).

The service node (116) of FIG. 6 includes a service application (124), computer software for administering the service node (116). The service application (124) of FIG. 6 includes a set of computer program instructions for node selection for executing a Java application among a plurality of nodes according to embodiments of the present invention. The service application (124) of FIG. 6 operates generally for node selection for executing a Java application among a plurality of nodes according to embodiments of the present invention by: tracking loaded Java classes currently loaded on each of the plurality of nodes (600); receiving an instruction to execute a Java application (158) using the plurality of nodes (600); identifying Java classes utilized in executing the Java application (158); selecting one of the plurality of nodes (600) for executing the Java application (158) in dependence upon the loaded Java classes and the Java classes utilized in executing the Java application (158); and configuring the Java application (158) for execution on the selected node (602).

The service application (124) of FIG. 6 may track the loaded Java classes currently loaded on each of the plurality of nodes by receiving, from each of the plurality of nodes (600), a loaded class notification specifying the loaded Java classes currently loaded on that node. The service application (124) of FIG. 6 may identify Java classes utilized in executing the Java application (158) in dependence upon historical runtime class loading information for the Java application (158) stored on the service node (116) or in the data storage (118).

In some other embodiments, the service application (124) of FIG. 6 may identify Java classes utilized in executing the Java application (158) by analyzing the Java application (158) to determine the Java classes utilized for the Java application (158).

In the exemplary system of FIG. 6, the service application (124) may select one of the plurality of nodes (600) for executing the Java application (158) by selecting the node (602) having already loaded all or a majority of the Java classes utilized in executing the Java application (158). Readers will note, however, that such an embodiment is for explanation and not for limitation. In some other embodiments, the service application (124) may select one of the plurality of nodes (600) for executing the Java application (158) by identifying a subset of the plurality of nodes (600) that collectively has already loaded all of the Java classes utilized in executing the Java application (158) and selecting a node included in the subset.

In the example of FIG. 6, the JVM (200) is a set of computer software programs and data structures which implements a virtual execution environment for a specific hardware platform. The JVM (200) of FIG. 6 accepts the Java application (158) for execution in a computer intermediate language, commonly referred to as Java byte code, which is a hardware-independent compiled form of the Java application (158). In such a manner, the JVM (200) of FIG. 6 serves to abstract the compiled version of the Java application (158) from the hardware of node (602) because the JVM (200) handles the hardware specific implementation details of executing the application (158) during runtime. Abstracting the hardware details of a platform from the compiled form of a Java application allows the application to be compiled once into byte code, yet run on a variety of hardware platforms.

As the JVM (200) executes the Java application (158), the JVM identifies a Java class utilized for the Java application (158). After the Java class is identified, the JVM (200) must load the Java classes for the application (158) into memory and prepare it for execution. The JVM (200) therefore includes a hierarchy of class loaders (620) that operate to load the classes specified by the application (158). The hierarchy of class loaders (620) includes a primordial class loader (622), an extension class loader (624), an application class loader (626), and a multi-node class loader (628).

The primordial class loader (622) of FIG. 6 loads the core Java libraries, such as 'core.jar,' 'server.jar,' and so on, in the '<JAVA_HOME>/lib' directory. The primordial class loader (622), which is part of the core JVM, is written in native code specific to the hardware platform on which the JVM is installed. The extension class loader (624) of FIG. 6 loads the code in the extensions directories and is typically implemented by the 'sun.misc.Launcher$ExtClassLoader' class. The application class loader (626) of FIG. 6 loads the class specified by 'java.class.path,' which maps to the system 'CLASSPATH' variable. The application class loader (626) is typically implemented by the 'sun.misc.Launcher$AppClassLoader' class. The multi-node class loader (628) of FIG. 6 is a custom class loader that may be used to retrieve Java classes already loaded on other nodes (604) and may be used to support some embodiments of the present invention.

For each class included or specified by the Java application (158), the JVM (200) effectively traverses up the class loader hierarchy to determine whether any class loader has previously loaded the class. The order of traversal is as follows: first to the multi-node class loader (628), then to the default application class loader (626), then to the extension class loader (624), and finally to the primordial class loader (622). If the response from all of the class loaders is negative, then the JVM (200) traverses down the hierarchy, with the primordial class loader first attempting to locate the class by searching the locations specified in its class path definition. If the primordial class loader (622) is unsuccessful, then the then the extension class loader (624) may a similar attempt to load the class. If the extension class loader (624) is unsuccessful, then the application class loader (626) attempts to load the class. Finally, if the application class loader (626) fails to load the class, then the multi-node class loader (628) attempts to load the class.

The multi-node class loader (628) of FIG. 6 may be used to retrieve Java classes already loaded on other nodes (604) by determines whether the particular class has already been loaded in the JVM (200) of the node (602) when the JVM (200) first determines whether the multi-node class loader (628) has already loaded the particular class. If the particular class has already been loaded in the JVM (200) of the node (602), the multi-node class loader (628) of FIG. 6 notifies the JVM (200) that the particular class has already been loaded. If the particular class has not already been loaded in the JVM (200) of the node (602), the multi-node class loader (628) of FIG. 6 then determines whether the Java class is already loaded on at least one of the other nodes (604). If the Java class is already loaded on at least one of the other nodes (604), the multi-node class loader (628) of FIG. 6 retrieves the loaded Java class from the other nodes (604) and notifies the JVM (200) that the particular class has already been loaded. In such a manner, the JVM (200) then executes the Java application using the loaded Java class retrieved from the other nodes (604). If the particular class is neither already loaded on the node (602) nor already loaded on one of the other nodes (604), then the multi-node class loader (628) notifies that the JVM (200) that the particular class is not loaded. The JVM (200) may then proceed to use the hierarchy of class loaders to load the class as described above.

In addition to loading classes for various Java applications, the multi-node class loader (628) of FIG. 6 supports node selection for executing a Java application among a plurality of nodes (600) according to embodiments of the present invention by providing runtime class loading information to the service node (116). The multi-node class loader (628) of FIG. 6 tracks the classes already loaded on the node (602) on which it is installed. Using this information, the multi-node class loader (628) may periodically update the service node (116) with runtime class loading information that specifies the classes already loaded on the node (602). In some other embodiments, the service node (116) may poll the multi-node class loader (628) for the runtime class loading information.

The JVM (200) of FIG. 6 also includes a heap (610), which is shared between all threads, and is used for storage of objects (612). Each object (612) represents an already loaded class. That is, each object (612) is in effect an instantiation of a class, which defines the object. Because an application (158) may utilize more than one object of the same type, a single class may be instantiated multiple times to create the objects specified by the application (158). Readers will note that the class loaders (620) are objects that are also stored on heap (610), but for the sake of clarity the class loaders (620) are shown separately in FIG. 6.

In the example of FIG. 6, the JVM (200) also includes a class storage area (636), which is used for storing information relating to the classes stored in the heap (610). The class storage area (636) includes a method code region (638) for storing byte code for implementing class method calls, and a constant pool (640) for storing strings and other constants associated with a class. The class storage area (636) also includes a field data region (642) for sharing static variables, which are shared between all instances of a class, and a static initialization area (646) for storing static initialization methods and other specialized methods separate from the method code region (638). The class storage area also includes a method block area (644), which is used to stored information relating to the code, such as invokers, and a pointer to the code, which may for example be in method code area (638), in JIT code area (616) described in detail below, or loaded as native code such as, for example, a dynamic link library ('DLL') written in C or C++.

A class stored as an object (612) in the heap (610) contains a reference to its associated data, such as method byte code, in class storage area (636). Each object (612) contains a reference to the class loader (620), which loaded the class into the heap (610), plus other fields such as a flag to indicate whether or not they have been initialized.

The JVM (200) of FIG. 6 also includes a storage area for just-in time ('JIT') code (616), equivalent to method byte code which has already been compiled into machine code to be run directly on the native platform. This code is created by the JVM (200) from Java byte code by a compilation process using JIT compiler (618), typically when the application program is started up or when some other usage criterion is met, and is used to improve run-time performance by avoiding the need for this code to be interpreted later.

In the example of FIG. 6, the JVM (200) also includes a stack area (614), which is used for storing the stacks associated with the execution of different threads on the JVM (200). Readers will note that because the system libraries and indeed parts of the JVM (200) itself are written in Java, which frequently utilize multi-threading, the JVM (200) may be supporting multiple threads even if the Java application (158) contains only a single thread.

Also included within JVM (200) of FIG. 6 is a class loader cache (634) and garbage collector (650). The former is typically implemented as a table that allows a class loader to trace those classes which it initially loaded into the JVM (200). The class loader cache (634) therefore allows each class loader (620) to determine whether it has already loaded a particular class when the JVM (200) initially traverses the class loader hierarchy as described above. Readers will note that it is part of the overall security policy of the JVM (200) that classes will typically have different levels of permission within the system based on the identity of the class loader by which they were originally loaded.

The garbage collector (650) is used to delete objects (612) from heap (610) when they are no longer required. Thus in the Java programming language, applications do not need to specifically request or release memory, rather this is controlled by the JVM (200) itself. Therefore, when the Java application (158) specifies the creation of an object (612), the JVM (200) secures the requisite memory resource. Then, when the Java application finishes using object (612), the JVM (200) can delete the object (612) to free up this memory resource. This process of deleting an object is known as 'garbage collection,' and is generally performed by briefly interrupting all threads on the stack (614), and scanning the heap (610) for objects (612) which are no longer referenced, and therefore can be deleted. The details of garbage collection vary from one JVM (200) implementation to another, but typically garbage collection is scheduled when the heap (610) is nearly exhausted and so there is a need to free up space for new objects (612).

In the example of FIG. 6, the JVM (200) also includes a monitor pool (648). The monitor pool (648) is used to store a set of locks or 'monitors' that are used to control contention to an object resulting from concurrent attempts to access the object by different threads when exclusive access to the object is required.

Although the JVM (200) in FIG. 6 is shown on and described above with regard to the selected node (602), readers will note that each of the other nodes (604) also has installed upon it a JVM configured in a similar manner. That is, each of the other nodes (604) also has installed upon it a set of class loaders that includes a multi-node class loader, class loader cache, and so on.

Figure 7:
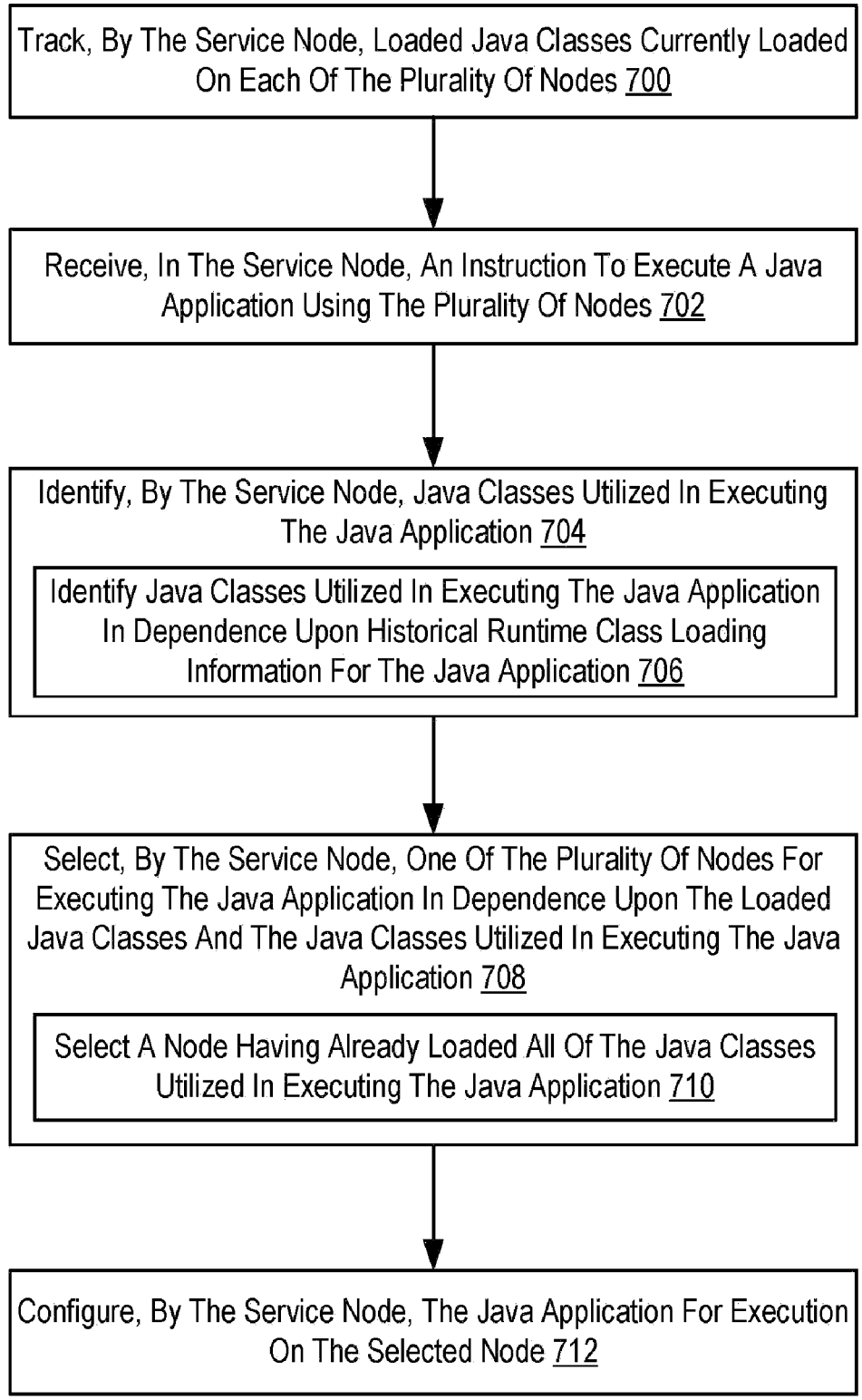
FIG. 7 sets forth a flow chart illustrating an exemplary method for node selection for executing a Java application among a plurality of nodes according to embodiments of the present invention.

For further explanation, FIG. 7 sets forth a flow chart illustrating an exemplary method for node selection for executing a Java application among a plurality of nodes according to embodiments of the present invention. The plurality of nodes are connected together for data communications using a data communication network. The plurality of nodes are also connected to a service node.

The method of FIG. 7 includes tracking (700), by the service node, loaded Java classes currently loaded on each of the plurality of nodes. The service node may track (700) the loaded Java classes currently loaded on each of the plurality of nodes according to the method of FIG. 7 by receiving, from each of the plurality of nodes, a loaded class notification specifying the loaded Java classes currently loaded on that node. The service node may receive a loaded class notification from each of the plurality of nodes by polling the multi-node class loader running on each of the nodes. As mentioned above, the multi-node class loader is a custom class loader installed in the JVM on each node that may track the classes currently loaded on the node on which it is installed. In some other embodiments, the service node may receive a loaded class notification from each of the plurality of nodes by periodically receiving updates from the multi-node class loaders installed on the nodes.

Rather than rely on communications between each of the nodes and the service node to track the loaded Java classes currently loaded on each of the nodes, the service node may track (700) the loaded Java classes according to the method of FIG. 7 by tracking the Java applications that the service node configures on each node and retrieving the classes utilized by each Java application from a repository of historical class loading information. The historical class loading information may be generated from previous class loading information supplied by the nodes on which those Java applications have previously been executed. In other embodiments, the historical class loading information may be generated from previous analysis performed by the service node on the Java applications to determine the Java classes utilized for those Java applications before installing those Java applications on one of the execution nodes.

The method of FIG. 7 includes receiving (702), in the service node, an instruction to execute a Java application using the plurality of nodes. The service node may receive (702) an instruction to execute the Java application using the plurality of nodes according to the method of FIG. 7 through a graphical user interface ('GUI') operated by a user. Through the GUI, the user may instruct the service node to load the Java application into the service node's memory from data storage and then execute the Java application on one of the plurality of nodes. In some other embodiments, the service node may also receive (702) an instruction to execute the Java application using the plurality of nodes according to the method of FIG. 7 during the execution of some other software application on the service node.

The method of FIG. 7 includes identifying (704), by the service node, Java classes utilized in executing the Java application. The service node may identify (704) the Java classes according to the method of FIG. 7 by identifying (706) the Java classes utilized in executing the Java application in dependence upon historical runtime class loading information for the Java application. The historical runtime class loading information specifies all the Java classes utilized for the Java application during runtime. The historical runtime class loading information for the Java application may be stored locally on the service node or by the service node in network-accessible data storage. The historical runtime class loading information for the Java application may have been previously received by the service node from one of the nodes that previously executed the Java application and tracked the Java classes utilized for the Java application. As mentioned above, the service may have polled the node executing the Java application for the runtime class loading information or the node may have sent the runtime class loading information to the service node periodically or as each of the Java classes for the application were loaded.

The method of FIG. 7 also includes selecting (708), by the service node, one of the plurality of nodes for executing the Java application in dependence upon the loaded Java classes and the Java classes utilized in executing the Java application. The service node may select (708) one of the plurality of nodes for executing the Java application according to the method of FIG. 7 by selecting (710) a node having already loaded all of the Java classes utilized in executing the Java application. The service node may select (710) a node having already loaded all of the Java classes utilized in executing the Java application according to the method of FIG. 7 by comparing the Java classes utilized in executing the Java application with the already loaded Java classes on each of the nodes and identifying the node having already loaded each of the Java classes utilized in executing the Java application. Readers will note that selecting (710) a node having already loaded all of the Java classes utilized in executing the Java application, however, is for explanation only and not for limitation. In some embodiments, the service node may select the node having already loaded a majority of the Java classes utilized in executing the Java application.

The method of FIG. 7 includes configuring (712), by the service node, the Java application for execution on the selected node. The service node may configure (712) the Java application for execution on the selected node according to the method of FIG. 7 by storing the Java application in the selected node's computer memory and writing values to the selected node's memory and processor registers that instruct the selected node to begin executing the Java application. Because the Java classes utilized by the Java application are already loaded in the JVM on the selected node, executing the Java application on the selected node does not incur the overhead associated with executing the Java application on a node that has not loaded any of the Java classes specified by the Java application.

The description above with reference to FIG. 7 explains that a service node may select one of the plurality of nodes for executing the Java application by selecting a node having already loaded all of the Java classes utilized in executing the Java application. In other embodiments, however, readers will note that a service node may select one of the plurality of nodes for executing the Java application by identifying a subset of the plurality of nodes that collectively has already loaded all of the Java classes utilized in executing the Java application and selecting a node included in the subset for executing the Java application. For further explanation, consider FIG. 8 that sets forth a flow chart illustrating a further exemplary method for node selection for executing a Java application among a plurality of nodes according to embodiments of the present invention.

Figure 8:
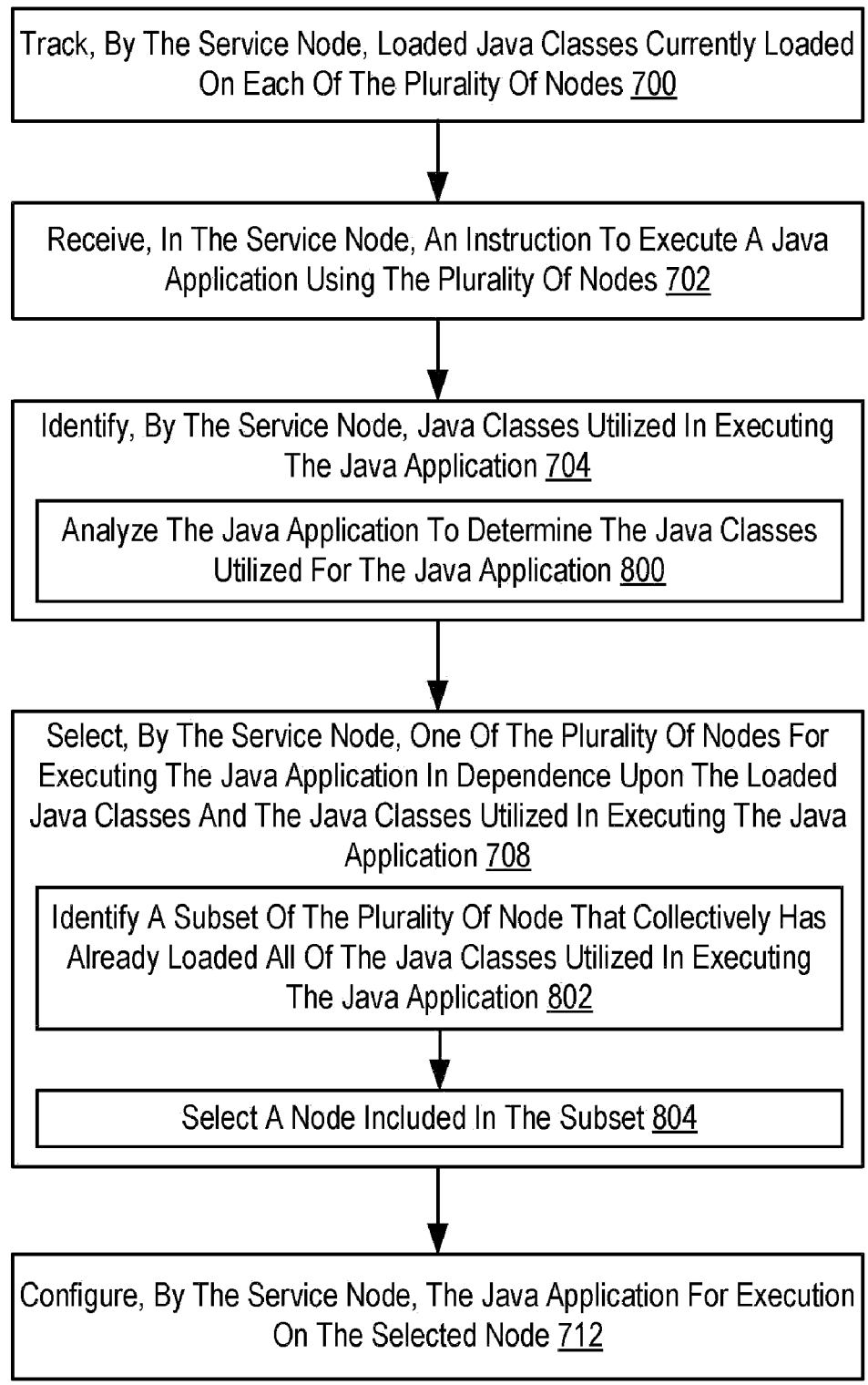
FIG. 8 sets forth a flow chart illustrating a further exemplary method for node selection for executing a Java application among a plurality of nodes according to embodiments of the present invention.

The method of FIG. 8 is similar to the method of FIG. 7. That is, the method of FIG. 8 includes: tracking (700), by the service node, loaded Java classes currently loaded on each of the plurality of nodes; receiving (702), in the service node, an instruction to execute a Java application using the plurality of nodes; identifying (704), by the service node, Java classes utilized in executing the Java application; selecting (708), by the service node, one of the plurality of nodes for executing the Java application in dependence upon the loaded Java classes and the Java classes utilized in executing the Java application; and configuring (712), by the service node, the Java application for execution on the selected node.

In the method of FIG. 8, identifying (704), by the service node, Java classes utilized in executing the Java application includes analyzing (800) the Java application to determine the Java classes utilized for the Java application. The service node may analyze (800) the Java application to determine the Java classes utilized for the Java application according to the method of FIG. 8 by parsing the Java byte code form of the Java application to identify various classes utilized for the Java application. In such a manner, the service node may identify the Java classes utilized in executing the Java application even if no historical runtime class loading information for the application exists.

In the method of FIG. 8, selecting (708), by the service node, one of the plurality of nodes for executing the Java application includes identifying (802) a subset of the plurality of nodes that collectively has already loaded all of the Java classes utilized in executing the Java application and selecting (804) a node included in the subset. The service node may identify (802) a subset of the plurality of nodes that collectively has already loaded all of the Java classes utilized in executing the Java application according to the method of FIG. 8 by traversing through a list of the nodes ordered according to each nodes position in the network topology, comparing the Java classes already loaded on each of the nodes with the Java classes utilized by the application, and identifying a subset of nodes grouped together in the list that collectively has already loaded all of the Java classes utilized in executing the Java application. In such a manner, the nodes in the subset are located near one another in the network topology for the data communications network connecting the nodes. The service node may select (804) a node included in the subset according to the method of FIG. 8 by selecting the node in the subset having already loaded the greatest number of Java classes utilized by the Java application to reduce the number of already loaded Java classes that need to be retrieved from the other nodes in the subset. The service node may select (804) a node included in the subset according to the method of FIG. 8 by selecting the node in the subset positioned nearest the middle of the subset to reduce the time that the node needs to access the already loaded Java classes on the other nodes in the subset. As mentioned above, nodes may access the Java classes already loaded on one another through a multi-node class loader installed in the JVM on each node.

Exemplary embodiments of the present invention are described largely in the context of a fully functional computer system for node selection for executing a Java application among a plurality of nodes. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of node selection for executing a software application among a plurality of nodes connected together for data communications using a data communication network, the plurality of nodes also connected to a service node, the method comprising:
   tracking, by the service node, loaded software classes currently loaded on each of the plurality of nodes;
   receiving, in the service node, an instruction to execute a software application using the plurality of nodes;
   identifying, by the service node, software classes utilized in executing the software application;
   selecting, by the service node, one of the plurality of nodes for executing the software application in dependence upon the loaded software classes and the software classes utilized in executing the software application, including selecting a node having already loaded at least a majority of the software classes utilized in executing the software application; and
   configuring, by the service node, the software application for execution on the selected node.

2. The computer-implemented method of claim 1 wherein tracking, by the service node, loaded software classes currently loaded on each of the plurality of nodes further comprises receiving, by the service node from each of the plurality of nodes, a loaded class notification specifying the loaded software classes currently loaded on that node.

3. The computer-implemented method of claim 1 wherein identifying, by the service node, software classes utilized in executing the software application further comprises identifying the software classes utilized in executing the software application in dependence upon historical runtime class loading information for the software application.

4. The computer-implemented method of claim 1 wherein identifying, by the service node, software classes utilized in executing the software application further comprises analyzing the software application to determine the software classes utilized for the software application.

5. The computer-implemented method of claim 1 wherein selecting, by the service node, one of the plurality of nodes for executing the software application in dependence upon the loaded software classes and the software classes utilized in executing the software application further comprises:

identifying a subset of the plurality of nodes that collectively has already loaded all of the software classes utilized in executing the software application; and selecting a node included in the subset.

6. The computer-implemented method of claim 1 wherein the plurality of nodes are comprised in a parallel computer and connected together using a plurality of data communications networks, at least one of the plurality of data communications networks optimized for point to point operations, and at least one of the plurality of data communications networks optimized for collective operations.

7. A parallel computer capable of node selection for executing a software application among a plurality of nodes, wherein the plurality of nodes are comprised in the parallel computer and connected together using a plurality of data communications networks, at least one of the plurality of data communications networks optimized for point to point operations, and at least one of the plurality of data communications networks optimized for collective operations, the plurality of nodes also connected to a service node of the parallel computer, the service node comprising a computer processor and computer memory operatively coupled to the computer processor, the computer memory for the execution node having disposed within it computer program instructions capable of:

tracking, by the service node, loaded software classes currently loaded on each of the plurality of nodes;

receiving, in the service node, an instruction to execute a software application using the plurality of nodes;

identifying, by the service node, software classes utilized in executing the software application;

selecting, by the service node, one of the plurality of nodes for executing the software application in dependence upon the loaded software classes and the software classes utilized in executing the software application, including selecting a node having already loaded at least a majority of the software classes utilized in executing the software application; and configuring, by the service node, the software application for execution on the selected node.

8. The parallel computer of claim 7 wherein identifying, by the service node, software classes utilized in executing the software application further comprises identifying the software classes utilized in executing the software application in dependence upon historical runtime class loading information for the software application.

9. The parallel computer of claim 7 wherein selecting, by the service node, one of the plurality of nodes for executing the software application in dependence upon the loaded software classes and the software classes utilized in executing the software application further comprises:

identifying a subset of the plurality of nodes that collectively has already loaded all of the software classes utilized in executing the software application; and selecting a node included in the subset.

10. A computer program product for node selection for executing a software application among a plurality of nodes connected together for data communications using a data communication network, the plurality of nodes also connected to a service node, the computer program product disposed upon a computer readable storage, medium, the computer program product comprising computer program instructions capable of:

tracking, by the service node, loaded software classes currently loaded on each of the plurality of nodes;

receiving, in the service node, an instruction to execute a software application using the plurality of nodes;

identifying, by the service node, software classes utilized in executing the software application;

selecting, by the service node, one of the plurality of nodes for executing the software application in dependence upon the loaded software classes and the software classes utilized in executing the software application, including selecting a node having already loaded at least a majority of the software classes utilized in executing the software application; and configuring, by the service node, the software application for execution on the selected node.

11. The computer program product of claim 10 wherein tracking, by the service node, loaded software classes currently loaded on each of the plurality of nodes further comprises receiving, by the service node from each of the plurality of nodes, a loaded class notification specifying the loaded software classes currently loaded on that node.

12. The computer program product of claim 10 wherein identifying, by the service node, software classes utilized in executing the software application further comprises identifying the software classes utilized in executing the software application in dependence upon historical runtime class loading information for the software application.

13. The computer program product of claim 10 wherein identifying, by the service node, software classes utilized in executing the software application further comprises analyzing the software application to determine the software classes utilized for the software application.

14. The computer program product of claim 10 wherein selecting, by the service node, one of the plurality of nodes for executing the software application in dependence upon the loaded software classes and the software classes utilized in executing the software application further comprises:

identifying a subset of the plurality of nodes that collectively has already loaded all of the software classes utilized in executing the software application; and selecting a node included in the subset.

15. The computer program product of claim 10 wherein the plurality of nodes are comprised in a parallel computer and connected together using a plurality of data communications networks, at least one of the plurality of data communications networks optimized for point to point operations, and at least one of the plurality of data communications networks optimized for collective operations.

* * * * *